United States Patent [19]
Liesen et al.

[11] Patent Number: 5,955,405
[45] Date of Patent: Sep. 21, 1999

[54] (METH) ACRYLATE COPOLYMERS HAVING EXCELLENT LOW TEMPERATURE PROPERTIES

[75] Inventors: Gregory Peter Liesen, Mechanicsville; Sanjay Srinivasan, Midlothian; Larry Dale Grina, Chesterfield, all of Va.

[73] Assignee: Ethyl Corporation, Richmond, Va.

[21] Appl. No.: 09/131,728

[22] Filed: Aug. 10, 1998

[51] Int. Cl.$^6$ .................................................. C10M 145/14
[52] U.S. Cl. ............................ 508/469; 252/79; 525/304
[58] Field of Search ................................................ 508/469

[56] References Cited

U.S. PATENT DOCUMENTS

| | | | |
|---|---|---|---|
| 3,833,501 | 9/1974 | Elliott et al. | 508/469 |
| 3,869,396 | 3/1975 | Van De Kraats et al. | 508/469 |
| 4,021,357 | 5/1977 | Morduchowitz et al. | 252/51.5 A |
| 4,146,492 | 3/1979 | Cusano et al. | 508/469 |
| 4,606,834 | 8/1986 | Hart et al. | 252/51.5 A |
| 4,867,894 | 9/1989 | Pennewiss et al. | 252/56 R |
| 5,112,509 | 5/1992 | Brink, Jr. et al. | 252/56 R |
| 5,188,770 | 2/1993 | Pennewiss | 508/469 |
| 5,312,884 | 5/1994 | Gore et al. | 526/328 |
| 5,368,761 | 11/1994 | Gore et al. | 252/56 R |
| 5,534,175 | 7/1996 | Cantiani | 508/469 |
| 5,756,433 | 5/1998 | Auschra et al. | 508/469 |

FOREIGN PATENT DOCUMENTS

| | | |
|---|---|---|
| 236844 B1 | 9/1987 | European Pat. Off. . |
| 439254 A2 | 7/1991 | European Pat. Off. . |

*Primary Examiner*—Ellen M. McAvoy
*Attorney, Agent, or Firm*—Dennis H. Rainear; Thomas Hamilton

[57] ABSTRACT

Non-dispersant poly (meth) acrylate copolymers comprising from about 5 to about 15 weight percent butyl methacrylate; from about 70 to about 90 weight percent of a C10–C15 alkyl (meth) acrylate; and from about 5 to about 10 weight percent of a C16–C30 alkyl (meth) acrylate provide excellent low temperature properties to lubricating oils.

25 Claims, No Drawings

(METH) ACRYLATE COPOLYMERS HAVING EXCELLENT LOW TEMPERATURE PROPERTIES

TECHNICAL FIELD

This invention relates to non-dispersant (meth) acrylate copolymers having excellent low temperature properties. The present invention also relates to the use of these copolymers as viscosity index improvers and pour point depressants for lubricating oils.

BACKGROUND OF THE INVENTION

Polymethacrylate viscosity index improvers (PMA VII's) are well known in the lubricating industry. Many attempts have been made to produce PMA VII's that have the desired balance of high temperature and low temperature viscometrics, as well as the required shear stability for a given application. The present invention is directed to novel non-dispersant (meth) acrylate copolymers which exhibit the necessary high and low temperature viscometrics as well as the necessary shear stability for numerous lubricating applications.

U.S. Pat. No. 4,021,357 is directed to multifunctional tetrapolymer lube oil additives. These tetrapolymers are dispersant polymethacrylates containing specific ratios of C1–C5, C10–C15 and C16–C20 (meth) acrylate monomers as well as a dispersant monomer. The copolymers of the present invention do not contain a dispersant monomer. Further, the copolymers of the present invention contain butyl methacrylate, a C10–C15 (meth) acrylate and a C16–C30 (meth) acrylate in proportions outside the ranges taught in the '357 patent.

U.S. Pat. No. 4,606,834 is directed to dispersant viscosity index improvers for lube oils containing a terpolymer of lauryl methacrylate, stearyl methacrylate and N,N-dimethylaminopropyl methacrylamide. The polymers of the present invention contain butyl methacrylate and do not contain a methacrylamide dispersant monomer.

U.S. Pat. No. 4,867,894 discloses pour point improving additives for mineral oils comprising from 10 to 30 mole percent methyl methacrylate, 10 to 70 mole percent of a linear C16 to C30 alkyl methacrylate, from 10 to 80 mole percent of a C4–C15 linear alkyl methacrylate and/or a C4 to C40 branched methacrylate, and from 0 to 30 mole percent of a free-radically polymerizable nitrogen-containing monomer having dispersing action. The polymers of the present invention do not contain methyl methacrylate or a dispersant monomer and contain less than 10 mole percent of the linear C16–C30 alkyl methacrylate.

U.S. Pat. No. 5,112,509 teaches a method for making a methyl methacrylate-lauryl methacrylate copolymer. This patent does not teach the copolymers of the present invention, which require butyl methacrylate and a C16–C30 (meth) acrylate.

U.S. Pat. Nos. 5,312,884 and 5,368,761 disclose copolymers useful as pour point depressants for lubricating oils comprising 15–67 mole percent C8–C 15 alkyl (meth) acrylates, 3–40 mole percent C16–C24 (meth) acrylates, and from greater than 30–65 mole percent C1–C4 methacrylates. These patents do not teach copolymers containing the specific monomers in the specific proportions required by the present claims. Further, these references do not teach that the copolymers are useful viscosity index improvers for lubricating oils.

U.S. Pat. No. 5,534,175 discloses copolymers of unsaturated fatty esters derived from 12–20 mass % of a C1–C3 (meth) acrylate, 45–72 mass % of a C11–C15 (meth) acrylate and 14–30 mass % of a C16–C25 (meth) acrylate. This patent does not teach the copolymers of the present invention which contain butyl methacrylate. Further, this patent fails to teach the specific monomer proportions required for the present invention.

EP 0 236 844 B1 teaches pour point improving agents derived from methyl methacrylate. This patent fails to teach the specific copolymers of the present invention or their use as viscosity index improvers for lubricating oils.

EP 0 439 254 A2 is directed to dispersant polymethacrylate viscosity index improvers. This application does not teach the specific non-dispersant viscosity index improvers of the present invention.

SUMMARY OF THE INVENTION

The present invention is directed to novel non-dispersant poly (meth) acrylates and their use as viscosity index improvers and/or pour point depressants for lubricating oils.

The poly (meth) acrylate copolymers of the present invention comprise units derived from:

(A) from about 5 to about 15, preferably 8 to 12, weight percent butyl methacrylate;

(B) from about 70 to about 90, preferably 80 to 85, weight percent of a C10–C15 alkyl (meth) acrylate; and (C) from about 5 to about 10, preferably 6 to 8, weight percent of a C16–C30 alkyl (meth) acrylate.

DETAILED DESCRIPTION OF THE INVENTION

The present invention is directed to non-dispersant poly (meth) acrylate copolymers comprising units derived from:

(A) from about 5 to about 15 weight percent butyl methacrylate;

(B) from about 70 to about 90 weight percent of a C10–C15 alkyl (meth) acrylate; and (C) from about 5 to about 10 weight percent of a C16–C30 alkyl (meth) acrylate.

The non-dispersant poly (meth) acrylate copolymers of the present invention comprise the reaction products of:

(A) from about 5 to about 15, preferably 8 to 12, weight percent butyl methacrylate;

(B) from about 70 to about 90, preferably 80 to 85, weight percent of a C10–C15 alkyl (meth) acrylate; and (C) from about 5 to about 10, preferably 6 to 8, weight percent of a C16–C30 alkyl (meth) acrylate.

The copolymers of the present invention have a relative number average molecular weight of from about 5,000 to about 5,000,000. The copolymers typically have a relative number average molecular weight, as determined by gel permeation chromatography using polymethyl methacrylate standards, between 5,000 and 300,000 when prepared by free-radical polymerization. When prepared by anionic polymerization the copolymers, whether linear or star, can have number average molecular weights of from 5,000 up to 5,000,000. When the molecular weights are above 1,000,000, light scattering techniques are used to accurately determine the number average molecular weight.

As used herein, C10–C15 alkyl (meth) acrylate means an alkyl ester of acrylic or methacrylic acid having a straight or branched alkyl group of 10 to 15 carbon atoms per group such as, decyl (meth) acrylate, isodecyl (meth) acrylate, undecyl (meth) acrylate, lauryl (meth) acrylate, myristyl (meth) acrylate, dodecyl pentadecyl methacrylate, and mixtures thereof.

As used herein, C16–C30 alkyl (meth) acrylate means an alkyl ester of acrylic or methacrylic acid having a straight or branched alkyl group of 16 to 30 carbon atoms per group such as, stearyl (meth) acrylate, cetyl (meth) acrylate, heptadecyl (meth) acrylate, nonadecyl (meth) acrylate, eicosyl (meth) acrylate, and mixture thereof such as, cetyl-eicosyl (meth) acrylate and cetyl-stearyl (meth) acrylate.

The copolymers of the present invention can be prepared by free-radical or anionic polymerization techniques.

Conventional methods of free-radical polymerization can be used to prepare the copolymers of the present invention. Polymerization of the acrylic and/or methacrylic monomers can take place under a variety of conditions, including bulk polymerization, solution polymerization, usually in an organic solvent, preferably mineral oil, emulsion polymerization, suspension polymerization and non-aqueous dispersion techniques.

Solution polymerization is preferred. In the solution polymerization, a reaction mixture comprising a diluent, the alkyl (meth) acrylate monomers, a polymerization initiator and a chain transfer agent is prepared.

The diluent may be any inert hydrocarbon and is preferably a hydrocarbon lubricating oil that is compatible with or identical to the lubricating oil in which the copolymer is to be subsequently used. The mixture includes, e.g., from about 15 to about 400 parts by weight (pbw) diluent per 100 pbw total monomers and, more preferably, from about 50 to about 200 pbw diluent per 100 pbw total monomers. As used herein, "total monomer charge" means the combined amount of all monomers in the initial, i.e., unreacted, reaction mixture.

In preparing the copolymers of the present invention by free-radical polymerization the acrylic monomers may be polymerized simultaneously or sequentially, in any order. In a preferred embodiment, the total monomer charge includes from 5 to 15 weight percent, preferably 8 to 12 weight percent, butyl methacrylate; 70 to 90 weight percent, preferably 80 to 85 weight percent, C12–C15 alkyl (meth) acrylate; and 5 to 10 weight percent, preferably 6 to 8 weight percent, C16–C30 alkyl (meth) acrylate.

Suitable polymerization initiators include initiators which disassociate upon heating to yield a free radical, e.g., peroxide compounds such as benzoyl peroxide, t-butyl peroctoate and cumene hydroperoxide; and azo compounds such as azoisobutyronitrile and 2,2'-azobis(2-methylbutanenitrile). The mixture includes from about 0.01 wt % to about 1.0 wt % initiator relative to the total monomer mixture.

Suitable chain transfer agents include those conventional in the art, e.g., dodecyl mercaptan and ethyl mercaptan. The selection of the amount of chain transfer agent to be used is based on the desired molecular weight of the polymer being synthesized as well as the desired level of shear stability for the polymer, i.e., if a more shear stable polymer is desired, more chain transfer agent can be added to the reaction mixture. Preferably, the chain transfer agent is added to the reaction mixture in an amount of 0.01 to 3 weight percent, preferably 0.02 to 2.5 weight percent, relative to the monomer mixture.

The reaction mixture is charged to a reaction vessel that is equipped with a stirrer, a thermometer and a reflux condenser and heated with stirring under a nitrogen blanket to a temperature from about 50° C. to about 125° C., for a period of about 0.5 hours to about 6 hours to carry out the copolymerization reaction.

In a further embodiment, a portion, e.g., about 25 to 60% of the reaction mixture is initially charged to the reaction vessel and heated. The remaining portion of the reaction mixture is then metered into the reaction vessel, with stirring and while maintaining the temperature of the batch within the above describe range, over a period of about 0.5 hours to about 3 hours.

A viscous solution of the copolymer of the present invention in the diluent is obtained as the product of the above-described process.

In an alternative embodiment, linear or star-branched copolymers may be prepared by anionic polymerization. Anionic polymerization initiators useful in the present invention include initiators of the formula:

in which M is an alkali metal or an alkaline earth metal and R is a straight-chain or branched alkyl or cyclo-alkyl preferably having from 1 to 6 carbon atoms or an aryl. Examples of such initiators include, for example, hydrocarbyl lithium initiators such as alkyllithium compounds, preferably methyl lithium, n-butyllithium, sec-butyllithium, cycloalkyllithium compounds, preferably, cyclohexyllithium and aryllithium compounds, preferably, phenyllithium, 1-methylstyryllithium, p-tolyllithium, naphthyllithium and 1,1-diphenyl-3-methylpentyllithium. Also useful inititors include, naphthalene sodium, 1,4-disodio-1,1,4,4-tetraphenylbutane, diphenylmethyl potassium, and diphenylmethyl sodium. Tertiary alcoholates of lithium and compounds containing trimethylsilyl groups may also be employed.

The anionic polymerization of the copolymers of the present invention is preferably carried out in the absence of moisture and oxygen and in the presence of at least one inert solvent. Preferably, the polymerization is conducted in the absence of any impurity that is detrimental to an anionic catalyst system. The inert solvent is preferably a hydrocarbon, such as isobutane, pentane, cyclohexane, benzene, toluene, xylene, tetrahydrofuran, diglyme, tetraglyme, orthoterphenyl, biphenyl, decalin or tetralin.

The copolymerization temperature useful in producing the copolymers of the present invention varies between about 30° C. and about −78° C., preferably between about 0° C. and −50° C.

The anionic polymerization process may optionally employ 1,1-diphenylethylene in the initiator system. 1,1-diphenylethylene has relatively high electro-affinity, does not homopolymerize and helps control the polydispersity of the copolymers.

Anionic polymerization enables the preparation of copolymers wherein the number average molecular weight is between about 5,000 to about 5,000,000 and having a polydispersity index, Mw/Mn, (ratio of the value of the weight-average molecular mass to the value of the number-average molecular mass) of about 1.0 to about 2.0, preferably from about 1.0 to about 1.5.

In the anionic polymerization process for producing the novel copolymers of the present invention, the polymerization is generally carried out in an inert atmosphere, for example under nitrogen, argon, etc. atmosphere. Equipment used in the polymerization reaction should be carefully dried such as by drying at about 150° C. for several hours. Solvents and reagents are also carefully dried. As an example, if tetrahydrofuran (THF) is used as the polymerization medium, the THF can be freshly distilled over sodium-benzophenone or anhydrous THF can be used. The monomers can be purified by passing the monomer or comonomer through alumina. Diphenyl ethylene (DPE) can be dried over molecular sieve. The metallic initiators may be used as received.

The linear or star branched copolymers of the present invention may be prepared by anionic polymerization in a continuous or a batch method. Suitable methods of preparing these polymers are taught in U.S. Pat. No. 5,552,491 and co-pending application Ser. No. 09/023,555, filed Feb. 13, 1998, both of which are hereby incorporated by reference.

In one embodiment, it is preferred, for purposes of achieving the desired polydispersity for the copolymers produced in the above-described batch process, that the comonomers be added to the polymerization reactor in a particular manner. The monomers are added to the reactor containing reaction medium and initiator together or sequentially depending upon whether random or block copolymers are desired. The comonomers are preferably added in one-shot (at once) as a single amount or rapidly added as a continuous stream. It is preferred that drop-wise addition not be used. The reaction can take place in a batch reactor, a continuous tubular reactor or any other suitable reactor wherein the polymerization reaction medium and the comonomers are contacted at once or in a rapid continuous manner. The reaction is quite fast and is normally complete within a few seconds. Conversion is also quite good in the instant process and is generally approximately 100% conversion.

When anionic polymerization is used, the copolymers of the present invention may be the "arms" of a star-branched polymer.

The core of the star-branched polymer is preferably an unsaturated acrylate or methacrylate ester of a polyol.

Typical of such esters are, for example, ethylene glycol diacrylate, ethylene glycol dimethacrylate, diethylene glycol diacrylate, diethylene glycol dimethacrylate, glycerol diacrylate, glycerol triacrylate, mannitol hexaacrylate, 4-cyclohexanediol diacrylate, 1,4-benzenediol dimethacrylate, pentaerythritol tetracrylate, 1,3-propanediol diacrylate, 1,5-pentanediol dimethacrylate, the bis-acrylates and methacrylates of polyethylene glycols of molecular weight 200–4000, and alpha, omega-polycaprolactonediol diacrylate, pentaerythritol triacrylate, 1,1,1-trimethylolpropane triacrylate, pentaerythritol tetraacrylate, triethylene glycol diacrylate, triethylene glycol dimethacrylate, 1,1,1-trimethylolpropane trimethacrylate or hexamethylenediol diacrylate and dimethacrylate.

The star-branched copolymers may be prepared by a core-first method or by a core-last method.

In the core-first method, an acrylate or methacrylate ester of a polyol is anionically polymerized in an anionic polymerization medium and the polymeric arms of the star are formed by contacting acrylic monomers with the anionic polymerization medium containing the preformed core.

In the core-last method, the polymeric arms are produced first by the anionic polymerization of the acrylic monomers. After the preparation of the polymeric arms, the acrylate or methacrylate ester of a polyol is introduced and contacted with the 'living' arms and the reaction proceeds to the formation of the star-branched polymer.

The star-branched copolymers preferably have a number average molecular weight of from about 50,000 to about 5,000,000.

To form the lubricating oils of the present invention, a base oil is treated with the copolymer of the invention in a conventional manner, i.e., by adding the copolymer to the base oil to provide a lubricating oil composition having a desired viscosity index and shear stability. Preferably, the lubricating oil contains from about 0.05 to about 40 pbw, preferably 0.5 to 40 pbw, of the neat copolymer (i.e., excluding diluent oil) per 100 pbw base oil. In a particularly preferred embodiment, the copolymer is added to the base oil in the form of a relatively concentrated solution of the copolymer in a diluent, e.g., a solution of about 100 pbw of the copolymer dissolved in from about 15 pbw to 600 pbw of the diluent used in the above described polymerization process. The diluent oil may be any of the oils referred to below that are suitable for use as base oils.

The finished lubricating oil composition may include other additives in addition to the copolymer of the present invention, e.g., oxidation inhibitors, corrosion inhibitors, friction modifiers, antiwear and extreme pressure agents, detergents, dispersants, antifoamants, additional viscosity index improvers and pour point depressants.

Base oils contemplated for use in this invention include natural oils, synthetic oils and mixtures thereof. Suitable base oils also include basestocks obtained by isomerization of synthetic wax and slack wax, as well as basestocks produced by hydrocracking (rather than solvent extracting) the aromatic and polar components of the crude. In general, both the natural and synthetic base oils will each have a kinematic viscosity ranging from about 1 to about 40 cSt at 100° C., although typical applications will require each oil to have a viscosity ranging from about 2 to about 20 cSt at 100° C.

Natural base oils include animal oils, vegetable oils (e.g., castor oil and lard oil), petroleum oils, mineral oils, and oils derived from coal or shale. The preferred natural base oil is mineral oil.

The mineral oils useful in this invention include all common mineral oil base stocks. This would include oils that are naphthenic or paraffinic in chemical structure. Oils that are refined by conventional methodology using acid, alkali, and clay or other agents such as aluminum chloride, or they may be extracted oils produced, for example, by solvent extraction with solvents such as phenol, sulfur dioxide, furfural, dichlordiethyl ether, etc. They may be hydrotreated or hydrorefined, dewaxed by chilling or catalytic dewaxing processes, or hydrocracked. The mineral oil may be produced from natural crude sources or be composed of isomerized wax materials or residues of other refining processes.

Typically the mineral oils will have kinematic viscosities of from 2 cSt to 40 cSt at 100° C. The preferred mineral oils have kinematic viscosities of from 2 to 20 cSt at 100° C.

Synthetic base oils include hydrocarbon oils and halo-substituted hydrocarbon oils such as oligomerized, polymerized, and interpolymerized olefins [e.g., polybutylenes, polypropylenes, propylene, isobutylene copolymers, chlorinated polylactenes, poly(1-hexenes), poly (1-octenes), etc., and mixtures thereof]; alkylbenzenes [e.g., polybutylenes, polypropylenes, propylene, isobutylene copolymers, chlorinated polylactenes, poly(1-hexenes), poly (1-octenes), etc., and mixtures thereof]; alkylbenzenes [e.g., dodecyl-benzenes, tetradecylbenzenes, dinonyl-benzenes, di(2-ethylhexyl)benzene, etc.]; polyphenyls [e.g., biphenyls, terphenyls, alkylated polyphenyls, etc.]; and alkylated diphenyl ethers, alkylated diphenyl sulfides, as well as their derivatives, analogs, and homologs thereof, and the like. The preferred synthetic oils are oligomers of a-olefins, particularly oligomers of 1-decene, also known as polyalpha olefins or PAO's.

Synthetic base oils also include alkylene oxide polymers, interpolymers, copolymers, and derivatives thereof where the terminal hydroxyl groups have been modified by esterification, etherification, etc. This class of synthetic oils is exemplified by: polyoxyalkylene polymers prepared by polymerization of ethylene oxide or propylene oxide; the alkyl and aryl ethers of these polyoxyalkylene polymers (e.g., methyl-polyisopropylene glycol ether having an average molecular weight of 1000, diphenyl ether of polypropylene glycol having a molecular weight of 100–1500); and mono- and poly-carboxylic esters thereof (e.g., the acetic acid esters, mixed $C_3$–$C_8$ fatty acid esters, and $C_{12}$ oxo acid diester of tetraethylene glycol).

Another suitable class of synthetic lubricating oils comprises the esters of dicarboxylic acids (e.g., phthalic acid, succinic acid, alkyl succinic acids and alkenyl succinic acids, maleic acid, azelaic acid, subric acid, sebasic acid, fumaric acid, adipic acid, linoleic acid dimer, malonic acid, alkylmalonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoethers, propylene glycol, etc.). Specific examples of these esters include dibutyl adipate, diisobutyl adipate, di(2-ethylhexyl) sebacate, di-n-hexyl fumarate, dioctyl sebacate, diisooctyl phthalate, diisooctyl azelate, diisooctyl adipate, diisodecyl azelate, didecyl phthalate, diisodecyl adipate, dieicosyl sebacate, the 2-ethylhexyl diester of linoleic acid dimer, and the complex ester formed by reacting one mole of sebasic acid with two moles of tetraethylene glycol and two moles of 2-ethyl-hexanoic acid, and the like. A preferred type of oil from this class of synthetic oils are adipates of $C_4$ to $C_{12}$ alcohols.

Esters useful as synthetic base oils also include those made from $C_5$ to $C_{12}$ monocarboxylic acids and polyols and polyol ethers such as neopentyl glycol, trimethylolpropane pentaerythritol, dipentaerythritol, tripentaerythritol, and the like.

Silicon-based oils (such as the polyalkyl-, polyaryl-, polyalkoxy-, or polyaryloxy-siloxane oils and silicate oils) comprise another useful class of synthetic lubricating oils. These oils include tetra-ethyl silicate, tetraisopropyl silicate, tetra-(2-ethylhexyl) silicate, tetra-(4-methyl-2-ethylhexyl) silicate, tetra-(p-tert-butylphenyl) silicate, hexa-(4-methyl-2-pentoxy)-disiloxane, poly(methyl)-siloxanes and poly (methylphenyl) siloxanes, and the like. Other synthetic lubricating oils include liquid esters of phosphorus containing acids (e.g., tricresyl phosphate, trioctylphosphate, and diethyl ester of decylphosphonic acid), polymeric tetrahydrofurans, poly-α-olefins, and the like.

The base oils may be derived from refined, re-refined oils, or mixtures thereof. Unrefined oils are obtained directly from a natural source or synthetic source (e.g., coal, shale, or tar sands bitumen) without further purification or treatment. Examples of unrefined oils include a shale oil obtained directly from a retorting operation, a petroleum oil obtained directly from distillation, or an ester oil obtained directly from an esterification process, each of which is then used without further treatment. Refined oils are similar to the unrefined oils except that refined oils have been treated in one or more purification steps to improve one or more properties. Suitable purification techniques include distillation, hydrotreating, dewaxing, solvent extraction, acid or base extraction, filtration, and percolation, all of which are known to those skilled in the art. Re-refined oils are obtained by treating used oils in processes similar to those used to obtain the refined oils. These re-refined oils are also known as reclaimed or reprocessed oils and are often additionally processed by techniques for removal of spent additives and oils breakdown products.

White oils, as taught in U.S. Pat. No. 5,736,490 incorporated herein by reference, may also be used. The white oil used as the base oil for the lubricant may be a white oil obtained by solvent extraction of a lubricant basestock feed and hydrogenation of the resulting raffinate in one or more hydrogenation stages to produce a white oil lubricant basestock which is virtually free of sulfur and nitrogen.

Lubricating oils containing the copolymers of the present invention may be used in a number of different applications including automatic transmission fluids, manual transmission fluids, hydraulic fluids, crankcase applications and shock absorber fluids.

Depending upon the intended end use of the lubricating oil formulations, the shear stability of the copolymer can be adjusted by controlling the amount of initiator and chain transfer agent present in the reaction mixture.

For example, in automatic transmission fluid applications it may be desired to have a highly shear stable lubricating fluid. In an embodiment of the present invention, automatic transmission fluids are prepared by adding to a base oil a copolymer of the present invention and a detergent/inhibitor package such that the fluids have a percent shear stability index (SSI) as determined by the 20 hour Tapered Bearing Shear Test in the range of 2% to about 80%. The 20 hour Tapered Bearing Shear Test is a published standard test entitled "Viscosity Shear Stability of Transmission Lubricants" and is described in CEC L-45-T-93 and is also published as DIN 51 350, part 6.

In another embodiment of the present invention, shock absorber fluids are prepared by adding to a base oil a copolymer of the present invention and a detergent/inhibitor package such that the fluids have a shear stability index (SSI) as determined by ASTM D-3945-86 (method A) in the range of 15% to about 75%.

EXAMPLES

To demonstrate the excellent low temperature properties of the copolymers of the present invention, two automatic transmission fluids were prepared containing the identical type and amount of detergent/inhibitor package and base oils. These fluids differed only in the type (VII-A or VII-B) of viscosity index improver used. No pour point depressant was added.

VII-A represents a polymer of the present invention comprising approximately 10 wt % butyl methacrylate, 84 wt % lauryl methacrylate and 6 wt % cetyl-eicosyl methacrylate. VII-A has a number average molecular weight of about 28,000.

VII-B is a polymethacrylate copolymer not within the scope of the present invention. VII-B is a copolymer containing approximately 13 wt % butyl methacrylate, 52 wt % lauryl methacrylate and 35% cetyl-eicosyl methacrylate. VII-B has a number average molecular weight of about 28,000.

TABLE 1

Low Temperature Properties of Automatic Transmission Fluids

|  | Brookfield Viscosity @ −40° C., cP |
| --- | --- |
| VII-A | 9360 |
| VII-B | Solid |

For automatic transmission fluids, it is critical to have Brookfield Viscosities, as measured at −40° C., of below 20,000 cP to ensure smooth and efficient operation of transmissions that are built with sophisticated electronic controls. In extremely cold climates, automatic transmission fluids having Brookfield Viscosities, as measured at −40° C., above 20,000 cP could potentially cause transmission problems due to poorer pumpability and sluggish movement of planetary gears and electronic valve bodies.

Automatic transmission fluids comprising VII-A exhibit a Brookfield Viscosity below 10,000 cP. Typically, such low Brookfield Viscosities are only exhibited in synthetic or partial synthetic fluids, such as those containing poly-alpha-olefins (PAOs) or mixtures of PAOs and synthetic esters. The viscosity index improvers of the present invention allow one to formulate without the use of expensive PAOs and/or synthetic esters and still obtain the desired low temperature properties. Automatic transmission fluids containing VII-B became solid during the testing thereby showing that VII-B is not a suitable viscosity index improver for automatic transmission fluids.

It is clear, from the above Table 1, that automatic transmission fluids comprising the polymethacrylate viscosity index improvers of the present invention (VII-A) exhibit superior low temperature properties compared to polymethacrylate viscosity index improvers outside the scope of the present invention (VII-B) as evidenced by the superior Brookfield Viscosity results.

To further demonstrate the excellent low temperature properties of the copolymers of the present invention, four shock absorber fluids were prepared containing identical base oils. These fluids differed only in the type (VII-C or VII-D) and amount of viscosity index improver used, no pour point depressant was added and the fluids exhibited equivalent % SSI as determined by ASTM D-3945-86 (method A).

VII-C represents a polymer of the present invention comprising approximately 10 wt % butyl methacrylate, 84 wt % lauryl methacrylate and 6 wt % cetyl-eicosyl methacrylate. VII-C has a number average molecular weight of 110,000.

VII-D is a polymethacrylate copolymer used in shock absorber fluid applications. VII-D is not within the scope of the present invention. Through chemical analysis, VII-D is believed to be a copolymer containing approximately 40 wt % methyl methacrylate and 60 wt % lauryl methacrylate and having a number average molecular weight of 160,000.

The two fluids exhibited equivalent high temperature high shear (HTHS) performance, however, as is clear from Table 2, the fluids containing the polymers of the present invention exhibited unexpectedly superior low temperature properties.

TABLE 2
Low Temperature Properties of Shock Absorber Fluids

|  | Treat Rate (wt %) | Pour Point (° C.) |
| --- | --- | --- |
| VII-C | 2.22 | −60 |
| VII-D | 2.22 | −42 |
| VII-C | 4.735 | −57 |
| VII-D | 4.735 | −48 |

It is clear, from the above Table 2, that shock absorber fluids comprising the polymethacrylate viscosity index improvers of the present invention (VII-C) exhibit superior low temperature properties compared to polymethacrylate viscosity index improvers outside the scope of the present invention (VII-D) as evidenced by the superior Pour Point results.

This invention is susceptible to considerable variation in its practice. Accordingly, this invention is not limited to the specific exemplifications set forth hereinabove. Rather, this invention is within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part of the invention under the doctrine of equivalents.

We claim:

1. A poly (meth) acrylate copolymer comprising units derived from:
   (A) from about 5 to about 15 weight percent butyl methacrylate;
   (B) from about 70 to about 90 weight percent of a C10–C15 alkyl (meth) acrylate; and
   (C) from about 5 to about 10 weight percent of a C16–C30 alkyl (meth) acrylate, wherein the copolymer is a non-dispersant poly (meth) acrylate copolymer.

2. The non-dispersant poly (meth) acrylate copolymer of claim 1 wherein (A)+(B)+(C)=100%.

3. A poly (meth) acrylate copolymer comprising the reaction product(s) of:
   (A) from about 5 to about 15 weight percent butyl methacrylate;
   (B) from about 70 to about 90 weight percent of a C10–C15 alkyl (meth) acrylate; and
   (C) from about 5 to about 10 weight percent of a C16–C30 alkyl (meth) acrylate, wherein the copolymer is a non-dispersant poly (meth) acrylate copolymer.

4. The non-dispersant poly (meth) acrylate copolymer of claim 3 wherein (A)+(B)+(C)=100%.

5. A copolymer according to claim 3 obtained by the sequential or simultaneous free-radical polymerization of monomers (A), (B) and (C).

6. The copolymer of claim 5 wherein the copolymer has a number average molecular weight of from about 5,000 to about 300,000.

7. A copolymer according to claim 3 obtained by the anionic polymerization of monomers (A), (B) and (C).

8. The copolymer of claim 7 wherein the copolymer has a number average molecular weight of from about 5,000 to about 5,000,000.

9. A star branched poly (alkyl) methacrylate copolymer wherein the arms of the star branched copolymer comprise the anionic polymerization reaction product(s) of:
   (A) from about 5 to about 15 weight percent butyl methacrylate;
   (B) from about 70 to about 90 weight percent of a C10–C15 alkyl (meth) acrylate; and
   (C) from about 5 to about 10 weight percent of a C16–C30 alkyl (meth) acrylate, wherein the copolymer is a non-dispersant poly (meth) acrylate copolymer.

10. The non-dispersant star-branched poly (meth) acrylate copolymer of claim 9 wherein (A)+(B)+(C)=100%.

11. The star-branched copolymer of claim 9 wherein the star-branched copolymer has a number average molecular weight of from about 50,000 to about 5,000,000.

12. A lubricating oil composition comprising:
   (A) an oil of lubricating viscosity; and
   (B) a poly (alkyl) methacrylate copolymer according to claim 3.

13. The lubricating oil composition of claim 12 wherein component (B) is present in an amount of from 0.05 to about 40 parts by weight of active copolymer per 100 parts by weight of oil.

14. The lubricating oil composition of claim 12 further comprising at least one additive selected from the group consisting of oxidation inhibitors, corrosion inhibitors, friction modifiers, antiwear and extreme pressure agents, detergents, dispersants, antifoamants, additional viscosity index improvers and pour point depressants.

15. A lubricating oil composition comprising:
    (A) an oil of lubricating viscosity; and
    (B) a star-branched poly (alkyl) methacrylate copolymer according to claim 9.

16. The lubricating oil composition of claim 15 wherein component (B) is present in an amount of from 0.05 to about 40 parts by weight of active copolymer per 100 parts by weight of oil.

17. The lubricating oil composition of claim 15 further comprising at least one additive selected from the group consisting of oxidation inhibitors, corrosion inhibitors, friction modifiers, antiwear and extreme pressure agents, detergents, dispersants, antifoamants, additional viscosity index improvers and pour point depressants.

18. A method for improving the low temperature properties of an oil, said method comprises adding to an oil of lubricating viscosity a poly (alkyl) methacrylate copolymer according to claim 3.

19. A method for improving the low temperature properties of an oil, said method comprises adding to an oil of lubricating viscosity a star-branched poly (alkyl) methacrylate copolymer according to claim 9.

20. A method for increasing the viscosity index of an oil, said method comprising adding to an oil of lubricating viscosity a poly (alkyl) methacrylate copolymer according to claim 3.

21. A method for increasing the viscosity index of an oil, said method comprising adding to an oil of lubricating viscosity a star-branched poly (alkyl) methacrylate copolymer according to claim 9.

22. An automatic transmission fluid comprising:
    (A) an oil of lubricating viscosity;
    (B) a poly (meth) acrylate copolymer according to claim 3; and
    (C) a detergent/inhibitor package, wherein the detergent/inhibitor package comprises at least one additive selected from the group consisting of oxidation inhibitors, corrosion inhibitors, friction modifiers, antiwear and extreme pressure agents, detergents, dispersants, antifoamants, and pour point depressants; wherein the automatic transmission fluid has a percent shear stability index, as determined by the 20 hour Tapered Bearing Shear Test, in the range of 2% to about 80%.

23. An automatic transmission fluid comprising:
    (A) an oil of lubricating viscosity;
    (B) a star-branched poly (meth) acrylate copolymer according to claim 9; and
    (C) a detergent/inhibitor package, wherein the detergent/inhibitor package comprises at least one additive selected from the group consisting of oxidation inhibitors, corrosion inhibitors, friction modifiers, antiwear and extreme pressure agents, detergents, dispersants, antifoamants, and pour point depressants; wherein the automatic transmission fluid has a percent shear stability index, as determined by the 20 hour Tapered Bearing Shear Test, in the range of 2% to about 80%.

24. A shock absorber fluid comprising:
    (A) an oil of lubricating viscosity;
    (B) a poly (meth) acrylate copolymer according to claim 3; and
    (C) a detergent/inhibitor package, wherein the detergent/inhibitor package comprises at least one additive selected from the group consisting of oxidation inhibitors, corrosion inhibitors, friction modifiers, antiwear and extreme pressure agents, detergents, dispersants, antifoamants, and pour point depressants; wherein the shock absorber fluid has a percent shear stability index, as determined by the ASTM D-3945-86 method A, in the range of 15% to about 75%.

25. A shock absorber fluid comprising:
    (A) an oil of lubricating viscosity;
    (B) a star-branched poly (meth) acrylate copolymer according to claim 9; and
    (C) a detergent/inhibitor package, wherein the detergent/inhibitor package comprises at least one additive selected from the group consisting of oxidation inhibitors, corrosion inhibitors, friction modifiers, antiwear and extreme pressure agents, detergents, dispersants, antifoamants, and pour point depressants; wherein the shock absorber fluid has a percent shear stability index, as determined by the ASTM D-3945-86 method A, in the range of 15% to about 75%.

* * * * *

UNITED STATES PATENT AND TRADEMARK OFFICE
CERTIFICATE OF CORRECTION

PATENT NO. : 5,955,405
DATED : Sep. 21, 1999
INVENTOR(S) : Gregory Peter Liesen, Sanjay Srinivasan, Larry Dale Grina It is certified that error appears in the above-identified patent and that said Letters Patent is hereby corrected as shown below:

Title page item [75], add -- Munmaya K. Mishra --

Col. 10, line 41, Claim 9, change "poly (alkyl) methacrylate" to -- polyalkyl (meth) acrylate --;

Col. 10, line 59, Claim 12, change "poly (alkyl) methacrylate" to -- polyalkyl (meth) acrylate --;

Col. 11, line 6, Claim 15, change "poly (alkyl) methacrylate" to -- polyalkyl (meth) acrylate --;

Col. 11, line 20, Claim 18, change "poly (alkyl) methacrylate" to -- polyalkyl (meth) acrylate --;

Col. 11, lines 24-25, Claim 19, change "poly (alkyl) methacrylate" to -- polyalkyl (meth) acrylate --;

Col. 11, line 28, Claim 20, change "poly (alkyl) methacrylate" to -- polyalkyl (meth) acrylate --;

Col. 11, line 32, Claim 21, change "poly (alkyl) methacrylate" to -- polyalkyl (meth) acrylate --.

Signed and Sealed this

Twentieth Day of June, 2000

*Attest:*

Q. TODD DICKINSON

*Attesting Officer*   *Director of Patents and Trademarks*